United States Patent [19]
Wurzburg et al.

[11] Patent Number: 5,546,591
[45] Date of Patent: Aug. 13, 1996

[54] DISTRIBUTED POWER MANAGEMENT SYSTEM FOR BATTERY OPERATED PERSONAL COMPUTERS

[75] Inventors: Henry Wurzburg, Chandler; Walter H. Potts, Tempe, both of Ariz.

[73] Assignee: VLSI Technology, Inc., San Jose, Calif.

[21] Appl. No.: 190,697

[22] Filed: Feb. 1, 1994

Related U.S. Application Data

[63] Continuation of Ser. No. 811,396, Dec. 20, 1991, abandoned.

[51] Int. Cl.⁶ .............................. G06F 13/10; G06F 9/00
[52] U.S. Cl. ...................... 395/750; 395/550; 395/375; 395/182.2; 364/707
[58] Field of Search .............................. 395/750, 550, 395/375; 364/707; 371/66

[56] References Cited

U.S. PATENT DOCUMENTS

| | | | |
|---|---|---|---|
| 4,399,538 | 8/1983 | Cholakian et al. | 371/66 |
| 4,425,628 | 1/1984 | Bedard et al. | 395/750 |
| 4,611,289 | 9/1986 | Coppola | 395/750 |
| 5,167,024 | 11/1992 | Smith et al. | 364/375 |
| 5,182,810 | 1/1993 | Bartling et al. | 395/750 |
| 5,203,000 | 4/1993 | Folkes et al. | 395/750 |
| 5,230,074 | 7/1993 | Canova, Jr. et al. | 395/750 |
| 5,237,692 | 8/1993 | Raasch et al. | 395/750 |
| 5,239,652 | 8/1993 | Seibert et al. | 395/750 |
| 5,396,635 | 3/1995 | Fung | 395/750 |
| 5,404,546 | 4/1995 | Stewart | 395/750 |
| 5,410,711 | 4/1995 | Stewart | 395/750 |

*Primary Examiner*—George B. Davis
*Attorney, Agent, or Firm*—Harry M. Weiss & Associates

[57] ABSTRACT

A system for providing power to peripheral components associated with a personal computer is disclosed. A local power management unit is located at each controller for a peripheral component in order to provide a distributive power management arrangement. The local power management units communicate with an activity monitor provided in a central power management unit. The foregoing arrangement permits power to be maintained to the bus interface microchips at all times. Deactuation of a controller associated with a peripheral component is accomplished through inhibiting the clock signal produced by the local power management unit associated with the controller. By maintaining power to the bus interface microchips, power leakage through the bus interface microchips is eliminated.

8 Claims, 2 Drawing Sheets

(PRESENT INVENTION)

DISTRIBUTED POWER MANAGEMENT SYSTEM FOR BATTERY OPERATED PERSONAL COMPUTERS

This is a continuation of application Ser. No. 07/811,396, filed Dec. 20, 1991, now abandoned.

TECHNICAL FIELD

The present invention relates, in general, to a power management system for personal computers and, more particularly, to a distributed power management system for battery operated personal computers which dedicates a power management unit for each peripheral component.

BACKGROUND ART

With the advent of battery operated personal computers there has become a need to monitor and control the distribution of power to peripheral components which operate in conjunction with the personal computer and perform various tasks. Such peripheral components may include keyboards, display screens, printers, modems, additional disk drives, etc. In industrial applications these peripheral components may also include valves, relays, solid state switches, etc. as output devices and transducers, sensing apparatus, etc., as input devices. In order to monitor, distribute and conserve power used by these peripheral devices, centralized power management units have been developed. These power management units, which either stand alone or are integrated into a system component, reduce power consumption by using two techniques. The first technique involves reducing the clock speed of the central processing unit (CPU) during periods of system inactivity, whereas the second technique involves switching the power "on" to a peripheral and its associated controller when use of the peripheral is required, and switching the power "off" during periods when the functions of the peripheral component are not needed. The centralized power management units perform the distinct functions of monitoring the activity of the peripheral components, controlling the clock speed of the CPU, regulating the power supply for all system components, and switching power "on" and "off" to appropriate peripheral components as required to minimize power consumption within the system.

The foregoing centralized power management system, by reason of the number and variety of tasks it must perform, is complex structurally and operationally. This type of power management system must be configured for the number and type of peripherals connected to the computer in order to adequately control power to these peripherals. In addition, since the centralized power management system turns power "off" to inactive peripherals and their respective controllers, the situation wherein a peripheral has its power turned "off" can lead to power leakage from the system bus through the bus interface microchips. When a peripheral has its power turned "off", the active bus signals connected to the interface microchips that are "off" in the peripheral controller result in partially powering these interface microchips via the substrate diode inherent in most integrated circuits. This substrate diode provides a path for the active input signals to the power supply bus in the peripheral and its associated controller which is supposed to be "off". The result is that all the components which are supposed to be "off" in the peripheral are actually partially powered and in a quasi-active state in which they consume power from the system. This power leakage through the bus interface microchips can significantly affect power consumption in the system.

Because of these inherent disadvantages, it has become desirable to develop a power management system which is less complex with respect to structure and operation, and which eliminates interface power leakage.

SUMMARY OF THE INVENTION

The present invention solves the problems associated with the prior art approaches and other problems by providing a power management system that is less complex structurally and operationally. The foregoing is accomplished by replacing the centralized power management unit with a power management unit at the controller for each peripheral component in order to achieve a distributed power management arrangement. In this manner, the power management unit at a controller, rather than the centralized power management unit, controls the application of power to its peripheral component, and controls the state of the associated peripheral controller. This distribution power control at each peripheral eliminates the need for a central power management system which must be configured for the number and type of peripherals in the system, therefore allowing for adding or deleting peripherals from the computer without reconfiguring the central power management system. In addition, the monitoring and power switching functions in the central power management system are no longer required since these functions are performed within each peripheral controller.

The problem of power leakage in the bus interface microchips is also eliminated since power to the peripheral controllers is not switched "on" and "off". Battery powered personal computers typically use complementary metal-oxide-semiconductor (CMOS) circuits which consume less power than other logic families. The characteristic of CMOS circuits is that appreciable power dissipation only occurs when the circuits are switching. The circuits can still be "on", and yet consume very little power if the circuits are inhibited from switching. The distributed power management system of the present invention eliminates power leakage through the bus interface microchips by maintaining power at the bus interface microchips. When these microchips are powered, the substrate diode cannot be reverse biased to allow power leakage. Even though the peripheral controllers are powered, the distributed power management unit at the peripheral inhibits the clock signal which is the source of switching activity in the peripheral controller. By maintaining power to the bus interface microchips and inhibiting the peripheral clock signal which controls all circuit switching within the peripheral controller, power leakage through the bus interface microchips is eliminated, thereby significantly reducing the power consumption of the computer.

DESCRIPTION OF THE PREFERRED EMBODIMENT

Figure 1:
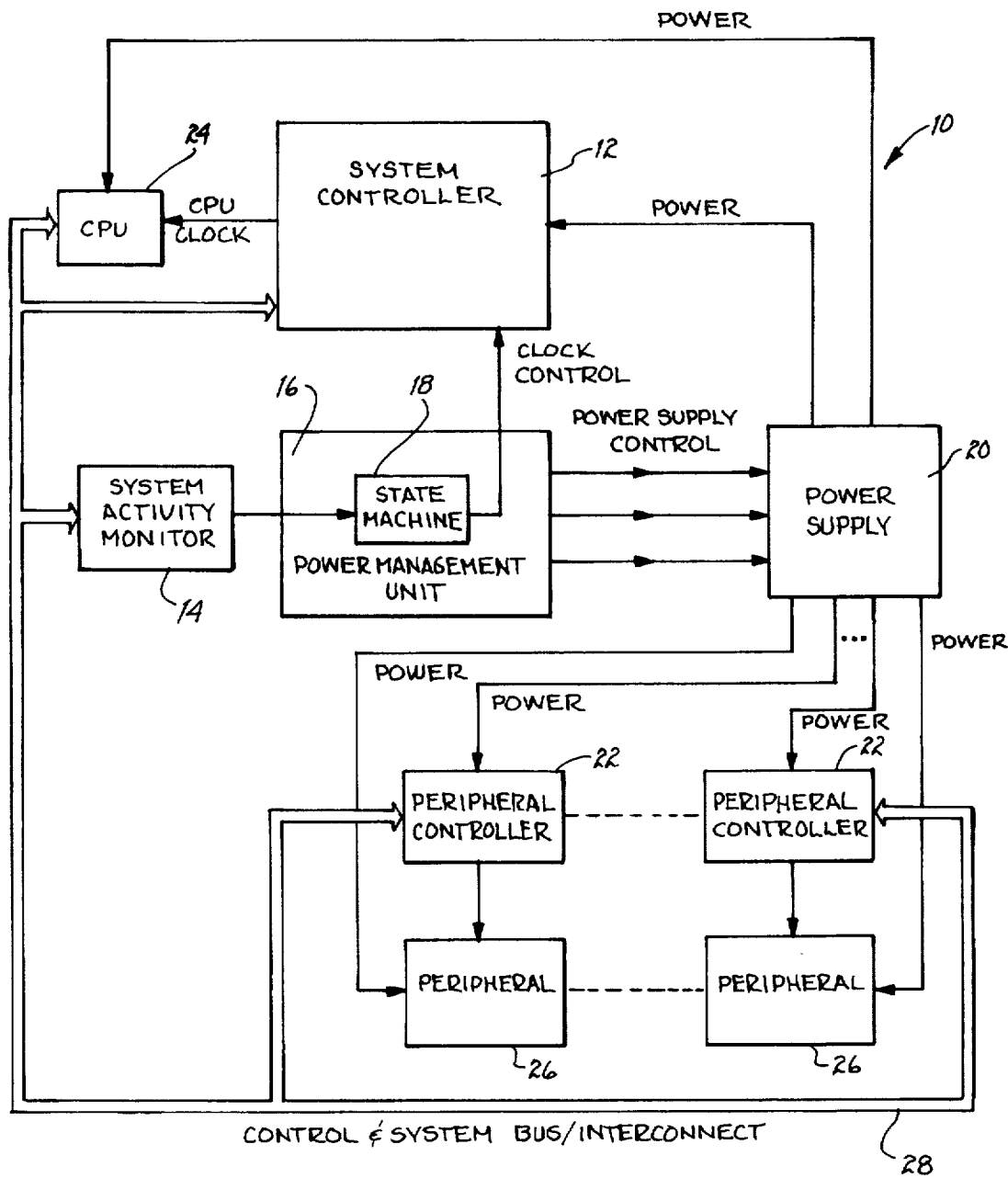
FIG. 1 is a schematic diagram of a prior art power management system for a battery operated personal computer.
Figure 2:
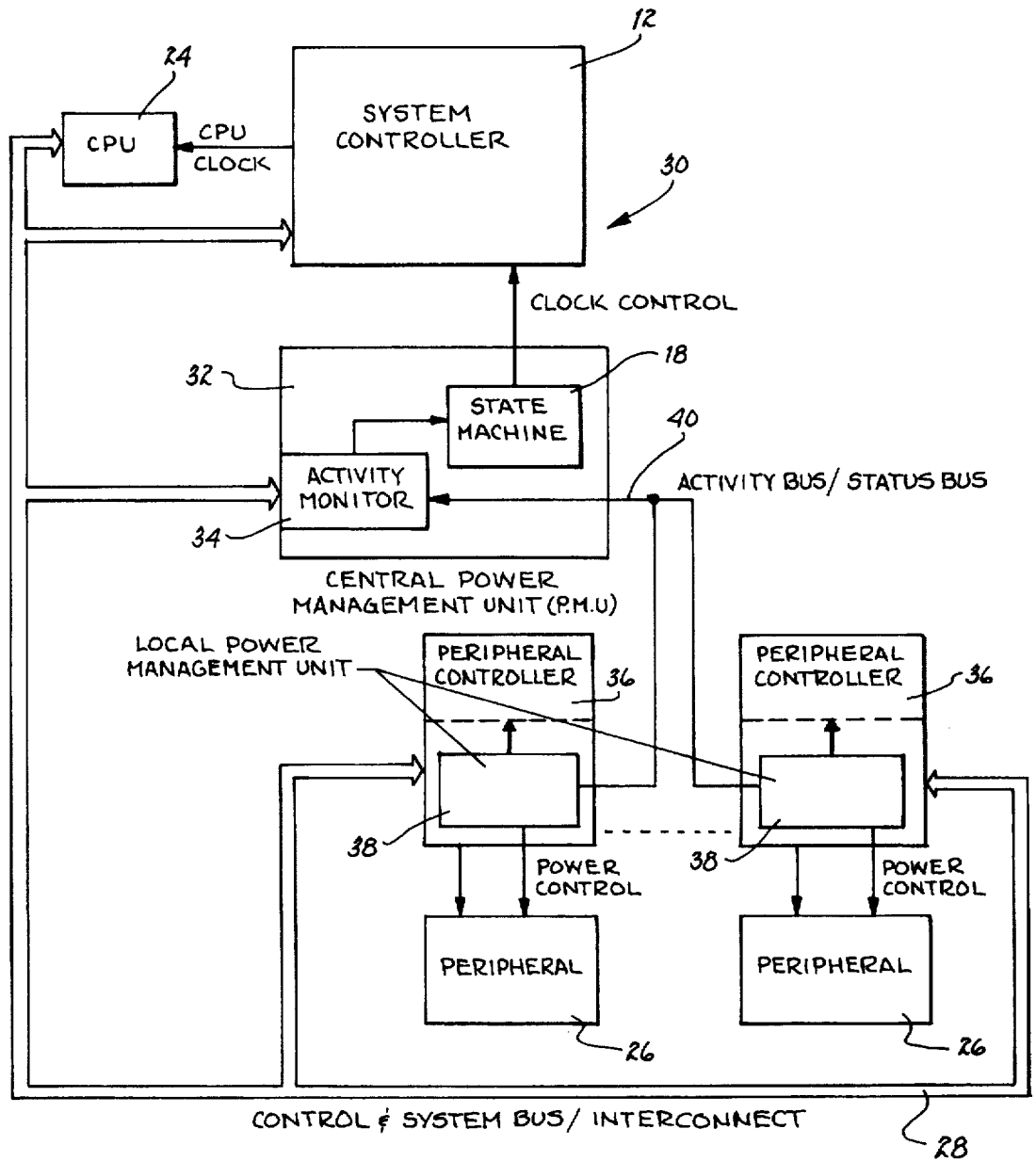
FIG. 2 is a schematic diagram illustrating the power management system of the present invention.

Referring now to the drawings where the illustrations are for the purpose of describing the preferred embodiment of the present invention and are not intended to limit the invention described herein, FIG. 1 is a schematic drawing of a prior art power management system 10 for a battery operated computer. As such, the power management system 10 is comprised of a system controller 12, a system activity monitor 14, a power management unit 16 having a state machine 18 therein, a power supply 20, and a plurality of peripheral controllers 22. The power management system 10 acts as an interface between a central processing unit (CPU) 24 within the battery operated computer and a plurality of peripheral components 26, each component 26 having a peripheral controller 22 associated therewith. The CPU 24, system controller 12, system activity monitor 14 and peripheral controllers 22 are interconnected by a bidirectional control and system bus 28. The output of the system activity monitor 14 is utilized as an input to the state machine 18 in the power management unit 16. The output of the state machine 18 is connected to an input to the system controller 12 and applied a clock control signal thereto. An output of the system controller 12 is connected to an input to the CPU 24 in order to provide a clock signal thereto. A plurality of outputs of the power management unit 16 are connected to inputs to the power supply 20 which supplies power to the CPU 24, the system controller 12, the peripheral controller 22 and the peripheral components 26. The foregoing prior art power management system 10 controls power distribution by reducing the clock speed of the CPU and/or by selectively switching the power "on" and "off" to each peripheral component depending upon its respective power requirements. As such, the foregoing prior art power management system 10 has a number of inherent disadvantages, e.g., it is structurally and operationally complex. The power management system 30 of the present invention is illustrated in FIG. 2. Those components which are similar to the components illustrated in FIG. 1 carry the same reference numerals. The power management system 30 is comprised of a system controller 12, a central power management unit 32 having an activity monitor 34 and a state machine 20 therein, and a plurality of peripheral controllers 36 each having a local power management unit 38 associated therewith. The power management system 30 acts as an interface between central processing unit (CPU) 24 within the battery operated computer and the plurality of peripheral components 26, each component 26 having a peripheral controller 36 associated therewith. Here again, the bidirectional control and system bus 28 is utilized to interconnect peripheral controllers 36 with CPU 24, system controller 12 and activity monitor 34. The power supply required to provide power to all of the foregoing components, other than the peripheral components 26, is not illustrated. The power management system 30 differs from the prior art power management system 10 in that a local power management unit 38 is provided within each peripheral controller 36 which is dedicated to a peripheral component 26. In addition, the power management system 30 further differs from the prior art management system 10 in that a unidirectional activity bus 40 is provided between each local power management unit 38 and the activity monitor 34. In this manner, communication as to the status of each peripheral component 26 can be communicated to the activity monitor 34 via the activity bus 40 rather than by the control and system bus 28. Furthermore, since each peripheral controller 36 contains a local power management unit 38, the switching of power "on" and "off" from a main power supply is eliminated. Power is also conserved since a local power management unit 38 is activated only when operation of its associated peripheral component 26 is desired.

A peripheral controller 36 is placed in an inactive, low power consumption state by the local power management unit 38 associated therewith by inhibiting the clock signal from the power management unit 38 to its associated peripheral controller 36. The power consumption by the peripheral component 26 can be controlled in like manner if the peripheral has CMOS circuitry, or it may be controlled by the local power management unit 38 switching power to the peripheral 26 "on" during periods of activity and "off" during periods of inactivity. Both of these methods for minimizing power consumption in the peripheral component 26 are controlled by the local power management unit 38, and make the power control for the peripheral component 26 dependent on the circuitry in the peripheral controller 36, and not on some set configuration of the central power management unit 32.

From the foregoing it is apparent that the power management system 30 of the present invention is much less complex structurally and operationally than the power management system 10 of the prior art. Since each peripheral controller 36 includes a local power management unit 38 which controls power consumption by the peripheral controller 36 and its associated peripheral component 26 when operation of that component is desired, switching of the main power supply is not required. Furthermore, since the peripheral controllers which interface with the control and system bus are always powered, interface leakage is eliminated, while low power operation of the peripheral controllers is achieved by inhibiting the clock signal that controls the functions of these controllers. In addition, peripherals may be added or deleted from the computer without reconfiguring the central power management unit.

Certain modifications and improvements will occur to those skilled in the art upon reading the foregoing. It should be understood that all such modifications and improvements have been deleted herein for the sake of conciseness and readability, but are properly within the scope of the following claims.

We claim:

1. A system for supplying power to at least one peripheral component associated with a computer, said system comprising:

a central processing unit (CPU);

at least one peripheral component having a controller associated therewith, said controller being coupled to said CPU;

a central power management unit coupled to said CPU;

at least one local power management unit associated with said peripheral component and its associated peripheral controller, said local power management unit having means for disabling a clock signal into said associated peripheral controller and for disabling power input into said peripheral component; and bus means for communicating between said local power management unit and said central power management unit.

2. The system as defined in claim 1 wherein said central power management unit further comprises activity monitor means for monitoring the activity of said local power management unit and its associated peripheral controller and peripheral component in the system.

3. The system as defined in claim 2 wherein said bus means comprising activity bus means located between said local power management unit and said activity monitor means, said activity bus means being independent of a control and system bus coupled to said CPU.

4. The system as defined in claim 1 wherein said local power management unit is configured such that said local power management unit disables said clock signal into said associated controller when said associated controller contains CMOS devices, and said local power management unit disables said power input into said associated peripheral component when said associated peripheral component does not contain CMOS devices.

5. A method for supplying power to at least one peripheral component associated with a computer comprising the steps of:

supplying a central processing unit (CPU);

operating at least one peripheral component having a controller associated therewith, said controller being coupled to said CPU;

running a central power management unit coupled to said CPU;

operating at least one local power management unit associated with said peripheral component and its associated peripheral controller, said local power management unit having means for disabling a clock signal into said associated peripheral controller and for disabling power input into said peripheral component; and coupling bus means for communicating between said local power management unit and said central power management unit.

6. The method as defined in claim 5 wherein said central power management unit further comprises activity monitor means for monitoring the activity of said local power management unit and its associated peripheral controller and peripheral component in the system.

7. The method as defined in claim 6 wherein said bus means comprising activity bus means located between said local power management unit and said activity monitor means, said activity bus means being independent of a control and system bus coupled to said CPU.

8. The method as defined in claim 5 wherein said local power management unit is configured such that said local power management unit disables said clock signal into said associated controller when said associated controller contains CMOS devices, and said local power management unit disables said power input into said associated peripheral component when said associated peripheral component does not contain CMOS devices.

\* \* \* \* \*